(12) United States Patent
Johnston, Jr.

(10) Patent No.: US 7,831,250 B2
(45) Date of Patent: *Nov. 9, 2010

(54) SYSTEM AND METHODS OF INTEGRATING AN OVERLAY WIRELESS DATA NETWORK CANOPY INTO A HIGH BANDWIDTH FTTX (FIBER-TO-THE PREMISES / CURB / NEIGHBORHOOD) NETWORK

(76) Inventor: Ernest Burns Johnston, Jr., 485 Bruce Way SW., Lilburn, GA (US) 30047-3025

( * ) Notice: Subject to any disclaimer, the term of this patent is extended or adjusted under 35 U.S.C. 154(b) by 0 days.

This patent is subject to a terminal disclaimer.

(21) Appl. No.: 12/578,617

(22) Filed: Oct. 14, 2009

(65) Prior Publication Data

US 2010/0074225 A1 Mar. 25, 2010

Related U.S. Application Data

(63) Continuation-in-part of application No. 11/456,768, filed on Jul. 11, 2006, now Pat. No. 7,623,858.

(51) Int. Cl.
*H04Q 7/20* (2006.01)
(52) U.S. Cl. .............. 455/426.1; 455/422.1; 455/403; 370/539
(58) Field of Classification Search .............. 455/426.1, 455/422.1, 403; 370/539
See application file for complete search history.

(56) References Cited

U.S. PATENT DOCUMENTS

| 7,016,362 | B2 | | 3/2006 | Mehravari | |
|---|---|---|---|---|---|
| 7,203,185 | B1 | * | 4/2007 | Dhara et al. | 370/352 |
| 2001/0046215 | A1 | * | 11/2001 | Kim | 370/329 |
| 2003/0048794 | A1 | * | 3/2003 | Sato et al. | 370/401 |
| 2003/0133413 | A1 | * | 7/2003 | Mehravari | 370/235 |
| 2006/0002319 | A1 | * | 1/2006 | Lee et al. | 370/310.1 |
| 2006/0040638 | A1 | * | 2/2006 | McQuaide, Jr. | 455/403 |

\* cited by examiner

*Primary Examiner*—Danh C Le
(74) *Attorney, Agent, or Firm*—Crose Law LLC; Bradley D. Crose

(57) ABSTRACT

An approach to integrate a wireless data network canopy into the high-capacity fixed FttX (Fiber-to-the-Premises/Curb/Neighborhood) network at intersection points throughout the overlay rather than interconnecting them as two disparate networks in order to provide a plurality of data containing video, audio, voice communications, broadcast radio programming, and data both fixed and mobile. This approach is applicable to active networks. Considerations must still be made for security.

10 Claims, 1 Drawing Sheet

SYSTEM AND METHODS OF INTEGRATING AN OVERLAY WIRELESS DATA NETWORK CANOPY INTO A HIGH BANDWIDTH FTTX (FIBER-TO-THE PREMISES / CURB / NEIGHBORHOOD) NETWORK

CROSS-REFERENCE TO RELATED APPLICATION(S)

This present non-provisional patent application is a continuation-in-part of copending U.S. patent application Ser. No. 11/456,768, filed on Jul. 11, 2006, and entitled, "SYSTEM AND METHODS OF INTEGRATING AN OVERLAY WIRELESS DATA NETWORK CANOPY INTO A HIGH BANDWIDTH FTTX (FIBER-TO-THE PREMISES/CURB/NEIGHBORHOOD) NETWORK" and of which the application cited above is incorporated in-full by reference herein.

FIELD OF THE INVENTION

The technology described herein relates generally to network communications. More specifically, this technology relates to systems and methods of integrating overlay wireless data network canopy into a high bandwidth FTTX (fiber to the premises/curb/neighborhood) network.

BACKGROUND OF THE INVENTION

Current practice is to design and deploy separate fixed communication and wireless telephone (e.g. cellular with data, 2.5 & 3G or Generation) or data-only (e.g. WiFi) networks and then offer similar services such as telephony, internet access and streaming video over each. These two (2) separate networks are then linked by a private connection or over the Internet. A simpler (i.e. cleaner, less complicated, more reliable) approach is to integrate this wireless connection into the high-capacity fixed network at intersection points through out the overlay rather than interconnecting them as two disparate networks.

Related patents known in the art include the following: U.S. Pat. No. 7,016,362, issued to Mehravari on Mar. 21, 2006, discloses a system and method for implementing wireless neighborhood area networks.

The foregoing patent and other information reflect the state of the art of which the inventor is aware and are tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides systems and methods of integrating overlay wireless data network canopy into a high bandwidth FTTX (fiber to the premises/curb/neighborhood) network.

In one exemplary embodiment, the technology disclosed includes a method of delivering low and high bandwidth mobile network applications encompassing VAD (Video, Audio including telephony or radio and Data) that takes advantage of the co-located fixed network which is already in place or is being installed, as a backbone to deliver these same services wirelessly. One efficient method of providing high bandwidth mobile services (e.g. streaming video, VOD, Video On Demand, and RAD, Radio On Demand) is through the use of relatively low powered microcells such as those used in commercially available IEEE standard 802.11 a/b/g/n (Wi-Fi), 802.16 (Wi-Max) or LTE data networks (which can also be used for determining location without need of GPS, Global Positioning System) connected in an overlapping manner as to form a canopy (contiguous domes or bubbles) of coverage along traffic-ways. Exact implementations could change as technologies evolve.

The utility is the underlying multimedia high capacity network available to the users wirelessly and mobile, subject only to the limitations of the wireless technology implemented at a particular node. Use of IPv6 will leverage its inherent QoS (Quality Of Service) and mobility features.

Other patents have described applications using currently implemented technologies, which require service(s) to be delivered to the premises. This system discloses co-locating contiguous Wireless data Access Points Of Presence (WAPs) along the route(s) as the conductors are implemented, either aerial or buried, for new high bandwidth communications networks. The services provided can be linked to those delivered to the fixed network users.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Figure 1:
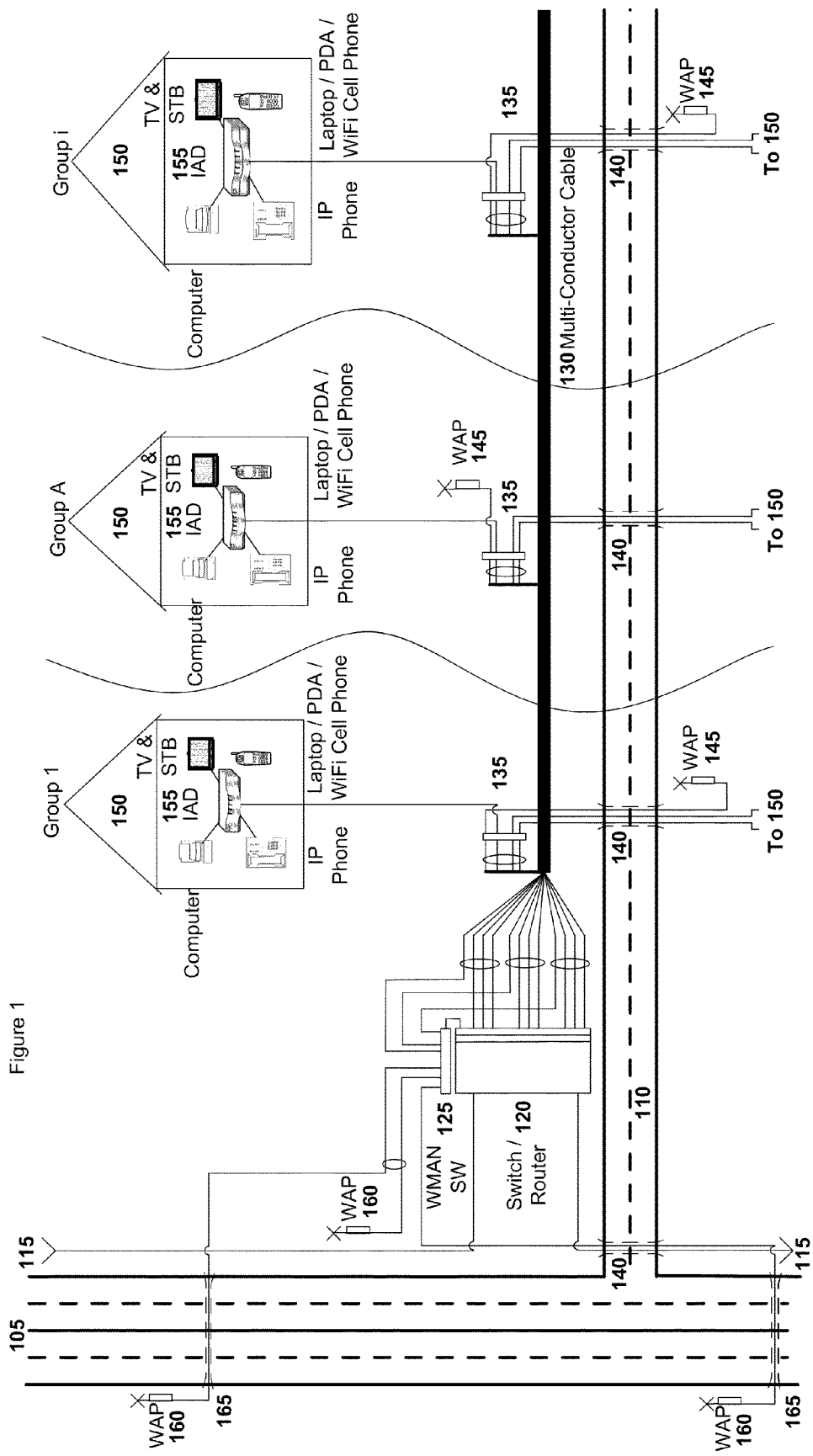
FIG. 1 is a schematic view of an active network implementation using multi-conductor cable which will probably but not necessarily be buried to carry signals from both the router/switch and the WMAN Switch (Wireless Metropolitan Area Network Switch, similar to a WLAN, Wireless Local Area Network switch), according to an embodiment of the technology described herein.

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides systems and methods of integrating overlay wireless data network canopy into a high bandwidth FTTX (fiber to the premises/curb/neighborhood) network.

Interconnection of a wireless data network, which may also carry video and voice, to a metropolitan area network (MAN) is most effectively done in an integrated fashion by merging the two networks.

FIG. 1 shows that as Information is delivered to a neighborhood network router/switch 120 from a high-capacity circuit 115 along a major traffic-way 105, possibly connected in a ring configuration. From this point a multi-conductor cable 130 distributes the data into the neighborhood with breakout points 135 for clusters of premises 150 (homes and/or businesses). From this cable hub 135 single cables are delivered to individual locations 150, however those crossing under a traffic-way 110 may share a single tunnel or conduit 140.

Near this hub 135, a WAP 145 may be installed as needed for mobile coverage depending on the proximity of the next hub 135 and the range of the wireless equipment. The conductor attached to the WAP 145 returns to the location of the router/switch 120 where it is connected instead to a WMAN Switch 125 that is in turn linked to the router/switch 120. Alternatively the WMAN Switch 125 may at some time be built into the router/switch 120. Those WAPs 145 may be placed on alternating sides of the traffic-way 110 for improved triangulation by the location determining system of paragraph [0007].

The other conductors broken out in the cable hub 135 connect over single cables to IADs (Integrated Access Device) 155 within the premises 150. Attached to the IAD through "home-run" cables are computers, phones, gaming systems, TV/STBs (Set Top Boxes, which may be built in), etc. This IAD may include a WAP to extend the wireless canopy into the premises for use by all subscribers. The consumer may also attach their own local WAP for wireless connectivity to various devices within the premises, rely on the integrated WAP in the IAD, if present, or rely on the strength of the curbside WAP 145 and associated security.

At implementation, as the feeder cable is being placed along the major traffic-way 105 to or from the router/switch 120, additional cables are brought with it from the WMAN Switch 125 to WAPs 160 spaced along this route 105 as to provide continuous wireless coverage from neighborhood to neighborhood. These WAPs 160 may be placed on alternating sides of the major traffic-way 105 for improved triangulation by the location determining system of paragraph [0007].

While in range, dual-mode phones and other wireless devices off-load the cellular network onto the WMAN freeing precious and more expensive WWAN (Wireless Wide Area Network, cellular) bandwidth. This is especially attractive as the WMAN is a high capacity wireless data network repeated every few hundred feet or so, allowing for a myriad of services. Once out of range of the wireless data network footprint, coverage reverts to the cellular voice and data network.

This wireless canopy is also useful for utility (electric, gas or water, etc) SmartGrid applications such as monitoring and control telemetry without costly and complicated cable installations. Other types are envisioned and encouraged.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. An integrated fixed and mobile communications system, the system comprising:
    at least one router/switch located proximate to a vehicular/pedestrian traffic-way, configured to receive data from and send data to a metropolitan area network (MAN) and configured to control a flow of the data to and from at least one premises located along the traffic-way and configured to control a flow of the data to and from at least one wireless metropolitan area network (WMAN) controller/switch;
    wherein the at least one WMAN controller/switch is located proximate to the router/switch and configured to control the flow of information between the router/switch and at least one wireless access point (WAP) and configured to coordinate a transition of mobile device communications from at least a first WAP to a second WAP;
    wherein the at least one premises is connected to the router/switch by a multi-conductor cable and a drop cable, if a subscriber; and
    wherein the integrated fixed and mobile communications system is proximate to the vehicular/pedestrian traffic-way, utilized with a very high speed and capacity fiber-to-the-premises/curb/neighborhood (FttX) packet data-only network to enable communications between a plurality of mobile devices and the FttX network, and configured to provide a plurality of data containing video, audio, voice communications, broadcast radio programming, and data.

2. The integrated fixed and mobile communications system of claim 1, wherein the at least one WAP is configured to communicate the plurality of data to and from any of the plurality of wireless devices located proximate to the traffic-way, and wherein the at least one WAP is coupled to the WMAN controller/switch by the multi-conductor cable.

3. The integrated fixed and mobile communications system of claim 1, wherein the at least one WAP is placed as necessary proximate to a breakout point along the multi-conductor cable where a drop cable to the premises emanates, such that a first coverage area and a second coverage area abut or overlap in such a manner that there is no loss of communications to the mobile devices as they move along the traffic-way.

4. The integrated fixed and mobile communications system of claim 1, wherein the at least one WAP is placed along a major traffic-way as the plurality of data is delivered between the router/switch and the MAN such that a first coverage area and a second coverage area abut or overlap in such a manner that there is no loss of communications to the mobile devices as they move along the major traffic-way, and wherein the at least one WAP also connects to the WMAN controller/switch by a means of direct conductors.

5. The integrated fixed and mobile communications system of claim 1, wherein multiple WAPs are placed in an alternating pattern along both sides of the traffic-way and/or major traffic-way to improve triangulation of a positioning system.

6. A method for integrated fixed and mobile communications, the method comprising:

utilizing an integrated fixed and mobile communications system comprising:
  at least one router/switch located proximate to a vehicular/pedestrian traffic-way, configuring the at least one router/switch to receive data from and send data to a metropolitan area network (MAN) and configuring the at least one router/switch to control a flow of the data to and from at least one premises located along the traffic-way; and
  at least one wireless metropolitan area network (WMAN) controller/switch located proximate to the router/switch and configured to control the flow of information between the router/switch and at least one wireless access point (WAP) and configured to coordinate a transition of mobile device communications from at least a first WAP to a second WAP;
connecting the at least one premises to the router/switch by a multi-conductor cable and a drop cable, if a subscriber;
placing the integrated fixed and mobile communications system proximate to the vehicular/pedestrian traffic-way; and
utilizing the integrated fixed and mobile communications system in a very high speed and capacity fiber-to-the-premises/curb/neighborhood (FttX) packet data-only network to enable communications between a plurality of mobile devices and the FttX network, and configured to provide a plurality of data containing video, audio, voice communications, broadcast radio programming, and data.

7. The method of claim 6, further comprising:
utilizing the at least one WAP to communicate the plurality of data to and from any of the plurality of wireless devices located proximate to the traffic-way, and wherein the at least one WAP is coupled to the WMAN controller/switch by the multi-conductor cable.

8. The method of claim 6, further comprising:
placing the at least one WAP, as necessary, proximate to a breakout point along the multi-conductor cable where a drop cable to the premises emanates, such that a first coverage area and a second coverage area abut or overlap in such a manner that there is no loss of communications to the mobile devices as they move along the traffic-way.

9. The method of claim 6, further comprising:
placing the at least one WAP along a major traffic-way as the plurality of data is delivered to and from the router/switch such that a first coverage area and a second coverage area abut or overlap in such a manner that there is no loss of communications to the mobile devices as they move along the major traffic-way, and wherein the at least one WAP also connects to the WMAN controller/switch by a means of direct conductors.

10. The method of claim 6, further comprising:
placing multiple WAPs in an alternating pattern along both sides of the traffic-way and/or major traffic-way to improve triangulation of a positioning system.

* * * * *